United States Patent [19]
Barfield

[11] Patent Number: 5,260,605
[45] Date of Patent: Nov. 9, 1993

[54] BROADBAND LOAD DISCONNECT VOLTAGE INVERSION

[75] Inventor: Robert T. Barfield, Durham, N.C.

[73] Assignee: Alcatel Network Systems, Inc., Richardson, Tex.

[21] Appl. No.: 847,615

[22] Filed: Mar. 5, 1992

[51] Int. Cl.$^5$ ............................ H02M 1/10; H02J 7/00
[52] U.S. Cl. ..................................... 307/127; 307/32; 340/310 R
[58] Field of Search ............................ 307/127, 38–40, 307/35, 31, 32, 140, 62, 64, 66; 361/245, 246, 76, 77, 82, 84; 320/25, 26, 30–34, 39, 40, 43; 340/310 R, 310 A

[56] References Cited

U.S. PATENT DOCUMENTS

| | | | |
|---|---|---|---|
| 4,348,582 | 9/1982 | Budek | 307/40 |
| 5,055,703 | 10/1991 | Schornack | 307/64 |
| 5,172,009 | 12/1992 | Mohan | 307/66 |

*Primary Examiner*—A. D. Pellinen
*Assistant Examiner*—Richard T. Elms
*Attorney, Agent, or Firm*—Ware, Fressola, Van Der Sluys & Adolphson

[57] ABSTRACT

A polarity switch changes the direction of DC to various loads in response to a sensed loss of AC and nonessential loads are shed in response to a sensed change in DC polarity at the various loads.

3 Claims, 1 Drawing Sheet

BROADBAND LOAD DISCONNECT VOLTAGE INVERSION

TECHNICAL FIELD

This invention relates to telecommunications and, more particularly, to a method for removing nonessential electrical loads from a battery driven power source during commercial AC power failures.

BACKGROUND OF THE INVENTION

It has been the practice in the prior art to provide backup power for maintaining telephone service to subscribers in the event of a commercial power supply failure. Such has required the sizing of backup power generators to meet the electrical loading requirements of the required number of subscribers.

Recent developments, however, have led to the integration of other services such as broadband video with narrowband voice communications over telephone lines. In the event of a power failure in that context, there is no need to maintain the broadband and other services since the commercial power supply feeding the equipment utilizing such services will be inoperative. Therefore, these broadband services may be considered as nonessential loads.

DISCLOSURE OF INVENTION

According to the present invention, nonessential broadband loads may be disconnected during a commercial AC power loss by sensing the loss of such power and providing a sensed loss of power signal to a polarity switcher responsive to DC power signals from a storage battery for changing the direction of current to both nonessential and essential loads and, at the load end, sensing the change in polarity and providing a signal indicative thereof for disconnecting nonessential narrowband loads.

The present invention provides a simple and effective means for shedding nonessential broadband loads in an integrated telecommunications network.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
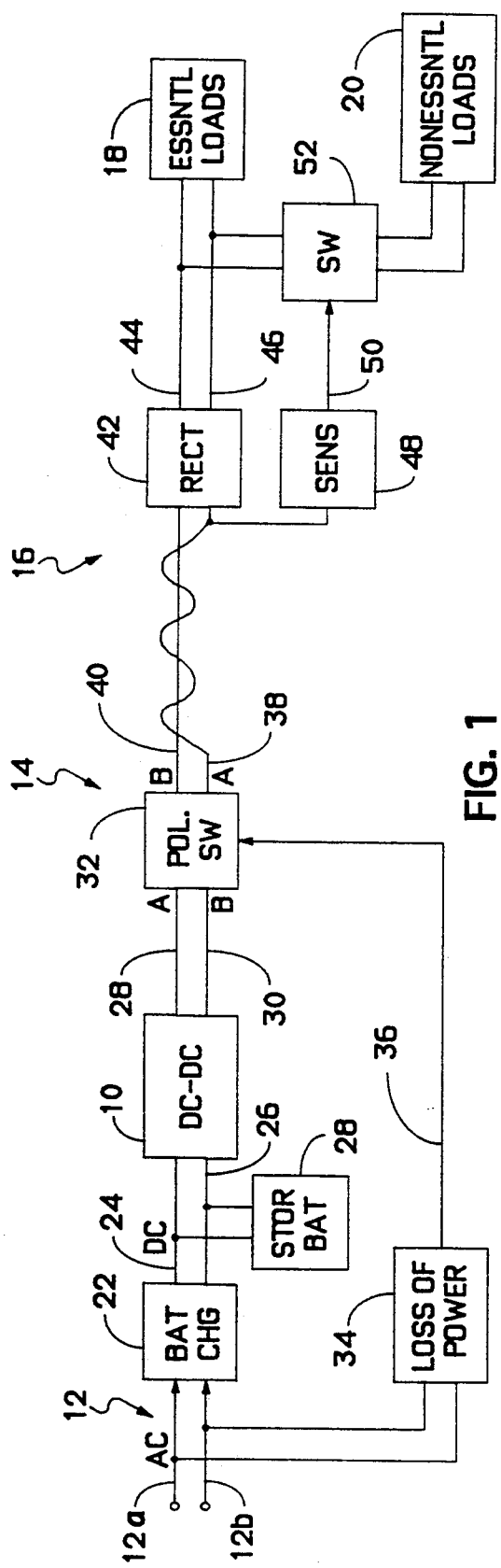
FIG. 1 is a block diagram of circuitry, according to the present invention, for shedding nonessential or broadband loads in the event of a power failure.

FIG. 1 shows means for carrying out a method for removing nonessential electrical loads from a battery driven power source 10 during a failure of a commercial AC power source 12. The system shown in FIG. 1 contains two major parts, i.e., a power source 14 for providing DC power to various loads 16 even in the event of a failure of AC power 12. The load 16 comprises essential loads 18 which may be narrowband voice communications for a plurality of subscribers and nonessential, e.g., broadband loads 20 to the same subscriber premises.

Under normal operating conditions, the AC power source 12 provides AC power on lines 12a, 12b to a battery charger 22 which in turn provides DC power on lines 24, 26 for providing a float charge or trickle discharge to a storage battery 28. Thus, the lines 24, 26 comprise a DC bus at a selected bus voltage. Thus, the storage battery 28 may comprise any number of cells arranged in series or parallel to provide a desired voltage level, e.g., 48 VDC, and the battery charger can provide a float voltage to maintain, for example, a trickle discharge from the storage battery.

Although a DC—DC converter 10 is shown for converting the DC bus voltage to another voltage level on lines 28, 30, such need not be provided and the DC bus voltage 24, 26 could conceivably be provided to a polarity switch 32 directly without converting to another DC level. In the embodiment shown, the DC—DC converter converts −48 VDC to −130 VDC.

Figure 2:
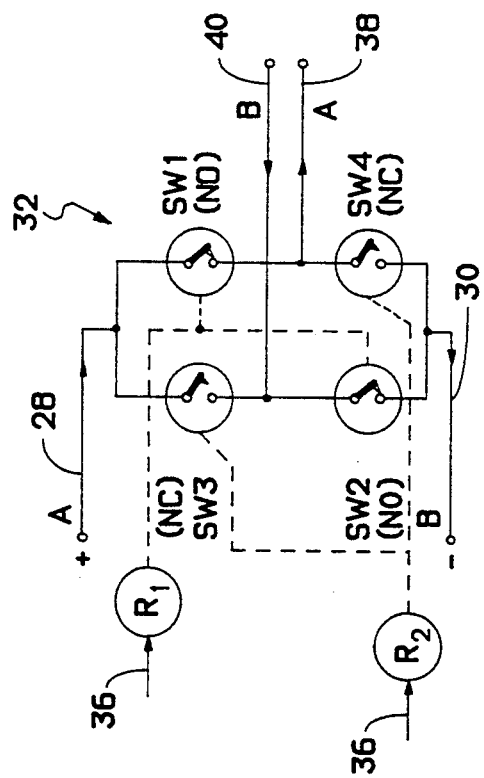
FIG. 2 is a simplified diagram of a polarity switch for changing the direction of current delivered to the various loads in a telecommunications network.

A loss of power sensing device 34 which may be a zero crossing detector or a comparator, for example, is responsive to the AC signals on lines 12a, 12b for providing a sensed loss of power signal on a line 36 to the polarity switch 32. A comparator, for example, would compare the signals on lines 12a, 12b to a reference for determining the existence of a loss of a desired level of voltage. A zero crossing device would detect the absence of a one or more zero crossings. As shown in FIG. 2, a plurality of switches designated SW1, SW2, SW3 and SW4 are arranged in a configuration in which either SW1 and SW2 are closed with SW3 and SW4 open, or vice versa, in response to the absence or presence, respectively, of the loss of power signal on the line 36. A relay coil R1 controls the two normally open contacts (SW1 & SW2) and a relay coil R2 controls the two normally closed contacts (SW3 & SW4). Thus, for example, if the AC power is present on the lines 12a, 12b then the signal on line 36 is present and SW1 and SW2 are closed with SW3 and SW4 open. This results in current flow as shown by the directional arrows in FIG. 2 with the "A" line 28 being connected through switch SW1 to a line 38 and the "B" line 30 being connected through the switch SW2 to a line 40. In the event of a sensed loss of power, the signal on the line 36 is absent and the coils R1 & R2 become deenergized. Thus, normally open contacts SW1 & SW2 open and normally closed contacts SW3 & SW4 close. Of course, it should be realized that the relays could be implemented as solid state devices such as FETs which are faster.

A full wave rectifier 42 is responsive to the signals on lines 38 and 40, which may be on a twisted pair in a telephony application, regardless of the switched condition of the switch 32 for providing essential loads 18 with power at all times. The full wave rectifier 42 has the capability of passing direct current of either polarity in the same direction.

A polarity sensor 48 detects a selected polarity on the line 38, for example, for providing a sensed signal on a line 50 to a load shedding switch 52. The polarity sensor may be a diode, opto-coupler or similar device. In response to a polarity change indicative of a loss of AC power 12, the sensor 48 will provide an appropriate signal on the line 50 for open circuiting the switch 52 and removing the nonessential loads 20 which may be broadband video or the like.

Although the invention has been shown and described with respect to a best mode embodiment thereof, it should be understood by those skilled in the art that the foregoing and various other changes, omission, and additions in the form and detail thereof may be made therein without departing from the spirit and scope of the invention.

I claim:

1. Apparatus, comprising:
    a battery charger, responsive to an AC power signal, for providing a DC charging signal on a DC bus;
    a storage battery, responsive to the DC charging signal, for providing a discharge signal on the DC bus;
    a DC—DC converter, responsive to the discharger signal, for providing a converted DC signal;
    a loss of power sensor, responsive to the AC power signal, for providing a loss of power signal in response to a loss of AC power;
    a polarity switch, responsive to the converted DC signal and to the loss of AC power signal, for providing an output signal having a selected polarity according to the magnitude of the loss of AC power signal;
    a full-wave rectifier, responsive to the output signal, for providing an essential load signal regardless of the selected polarity of the output signal;
    polarity sensing means, responsive to the polarity of the output signal, for providing a sensed polarity signal; and
    a switch, responsive to the essential load signal and to the sensed polarity signal, for disconnecting a nonessential load.

2. A method, comprising the steps of:
    checking for a loss of AC power to a battery charger and providing a loss of power signal in the presence of an AC power failure;
    switching polarity of a DC bus supplied by energy provided by the battery charger in response to the loss of power signal;
    sensing the polarity of the DC bus; and
    disconnecting nonessential loads from the DC bus in response to a selected sensed polarity thereof.

3. Apparatus, comprising:
    means, responsive to AC power, for checking for a loss of AC power to a battery charger and for providing a loss of power signal in the presence of a loss of AC power;
    a polarity switch, responsive to the loss of power signal, for switching polarity of DC supplied by energy derived from the AC power;
    means, responsive to the polarity of the DC provided by the polarity switch, for providing a sensed polarity signal; and
    disconnect means, responsive to the sensed polarity signal and to the DC, for disconnecting the DC from nonessential loads.

* * * * *